(12) United States Patent
Aoki

(10) Patent No.: US 9,487,981 B1
(45) Date of Patent: Nov. 8, 2016

(54) CYLINDRICAL DUAL AXIS HINGE FOR ELECTRONIC DEVICES

(71) Applicant: Intel Corporation, Santa Clara, CA (US)

(72) Inventor: Russell S. Aoki, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/751,752

(22) Filed: Jun. 26, 2015

(51) Int. Cl.
G06F 1/16 (2006.01)
E05D 11/00 (2006.01)
E05D 3/12 (2006.01)

(52) U.S. Cl.
CPC ............ *E05D 11/0081* (2013.01); *E05D 3/12* (2013.01); *G06F 1/1618* (2013.01); *G06F 1/1681* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,583,744 | A * | 12/1996 | Oguchi | ............... | G06F 1/1616 16/223 |
| 5,594,617 | A * | 1/1997 | Foster | ................ | G06F 1/1616 361/679.02 |
| 5,666,694 | A * | 9/1997 | Slow | .................. | G06F 1/1618 16/308 |
| 5,949,408 | A * | 9/1999 | Kang | ................. | G06F 1/1618 345/100 |
| 6,002,583 | A * | 12/1999 | Shoji | .................. | G06F 1/1616 361/679.55 |
| 6,078,496 | A | 6/2000 | Oguchi et al. | | |
| 6,191,941 | B1 * | 2/2001 | Ito | ..................... | G06F 1/1616 312/223.1 |
| 6,385,041 | B1 * | 5/2002 | Choi | ................... | G06F 1/1616 16/221 |
| 6,980,420 | B2 * | 12/2005 | Maskatia | ............ | G06F 1/1616 248/917 |
| 7,155,266 | B2 * | 12/2006 | Stefansen | ............ | H04M 1/022 16/368 |
| 7,167,358 | B2 * | 1/2007 | Iwasaki | ................ | G06F 1/1601 248/917 |
| 7,308,733 | B2 | 12/2007 | An et al. | | |
| 7,414,834 | B2 * | 8/2008 | Ukonaho | ............. | H04M 1/022 16/354 |
| 7,778,016 | B2 * | 8/2010 | Minaguchi | ........... | G06F 1/1616 312/223.2 |

(Continued)

FOREIGN PATENT DOCUMENTS

| | | |
|---|---|---|
| EP | 1780505 A2 | 5/2007 |
| EP | 2325719 A2 | 5/2011 |
| KR | 10-2006-0006586 A | 1/2006 |

OTHER PUBLICATIONS

International Search Report and Written Opinion received for PCT Patent Application No. PCT/US2012/066784, mailed on Jun. 2, 2013, 14 pages.

(Continued)

*Primary Examiner* — Lisa Lea Edmonds
(74) *Attorney, Agent, or Firm* — Inventive Patent Law, P.C.; Jim H. Salter

(57) ABSTRACT

A cylindrical dual axis hinge for electronic devices is disclosed. A particular embodiment includes: a primary hinge having a primary pivot with a first axis of rotation, the primary hinge including a primary hinge bracket attachable to a portion of the electronic device; a cylindrical hinge subassembly including a secondary cylindrical hinge rotating portion and a secondary cylindrical hinge fixed portion, the cylindrical hinge subassembly including a secondary pivot with a second axis of rotation different from the first axis of rotation and enabling rotation of the secondary cylindrical hinge rotating portion around the secondary pivot, the cylindrical hinge subassembly being attachable to a portion of the electronic device; and a cylindrical electrical power storage receptacle configured to retain a plurality of electrical power storage elements, the electrical power storage elements being in electrical contact with the electronic device, the cylindrical electrical power storage receptacle being removably attachable to the electronic device.

23 Claims, 11 Drawing Sheets

(56) References Cited

U.S. PATENT DOCUMENTS

| | | | | |
|---|---|---|---|---|
| 7,936,559 B2* | 5/2011 | Chen | ............... | G06F 1/1662 |
| | | | | 16/303 |
| 8,042,231 B2* | 10/2011 | Bae | ............... | G06F 1/1616 |
| | | | | 16/367 |
| 8,264,823 B2* | 9/2012 | Kim | ............... | H04M 1/0216 |
| | | | | 345/173 |
| 8,947,861 B2* | 2/2015 | Staats | ............... | G06F 1/162 |
| | | | | 361/679.02 |
| 9,019,694 B2* | 4/2015 | Lee | ............... | G06F 3/0221 |
| | | | | 248/229.22 |
| 9,244,496 B2* | 1/2016 | Sharma | ............... | G06F 1/1654 |
| 2008/0232043 A1 | 9/2008 | Wang | | |
| 2012/0066865 A1 | 3/2012 | Lauder et al. | | |
| 2012/0194972 A1 | 8/2012 | Bohn et al. | | |
| 2013/0194741 A1 | 8/2013 | Uchiyama et al. | | |
| 2014/0285960 A1 | 9/2014 | Sharma et al. | | |
| 2015/0185788 A1* | 7/2015 | Matsuoka | ............... | B21D 53/40 |
| | | | | 361/679.02 |
| 2016/0010374 A1* | 1/2016 | Hsu | ............... | G06F 1/16 |
| | | | | 74/414 |

OTHER PUBLICATIONS

International Search Report and Written Opinion received for PCT Patent Application No. PCT/US2016/033030, mailed on Aug. 23, 2016, 12 pages.

* cited by examiner

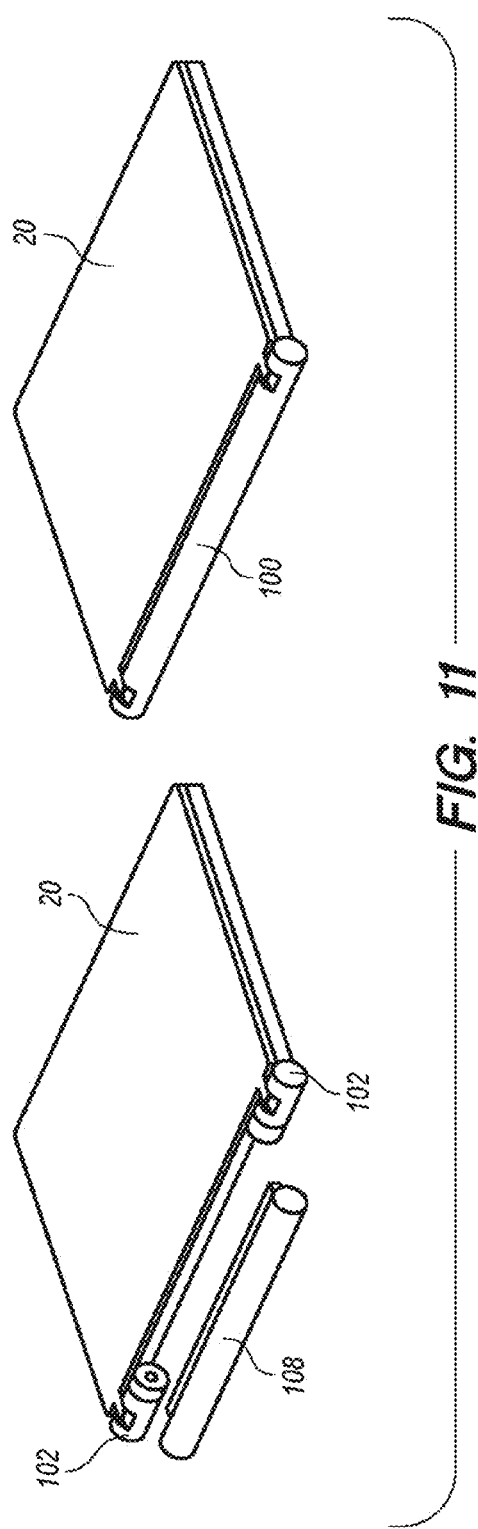

```
┌─────────────────────────────────────────────────┐
│   A Cylindrical Dual Axis Hinge for Electronic Devices   │
│                 Processing Logic                │
│                     -1100-                      │
└─────────────────────────────────────────────────┘
                         ▼
┌─────────────────────────────────────────────────┐
│ Provide a primary hinge having a primary pivot with a first axis of rotation, the │
│ primary hinge including a primary hinge bracket attachable to a portion of the │
│                  electronic device.             │
│                     -1110-                      │
└─────────────────────────────────────────────────┘
                         ▼
┌─────────────────────────────────────────────────┐
│ Provide a cylindrical hinge subassembly including a secondary cylindrical hinge │
│ rotating portion and a secondary cylindrical hinge fixed portion, the cylindrical │
│ hinge subassembly including a secondary pivot with a second axis of rotation │
│ different from the first axis of rotation and enabling rotation of the secondary │
│ cylindrical hinge rotating portion around the secondary pivot, the cylindrical │
│ hinge subassembly being attachable to a portion of the electronic device. │
│                     -1120-                      │
└─────────────────────────────────────────────────┘
                         ▼
┌─────────────────────────────────────────────────┐
│ Provide a cylindrical electrical power storage receptacle configured to retain a │
│    plurality of electrical power storage elements, the electrical power storage │
│ elements being in electrical contact with the electronic device, the cylindrical │
│ electrical power storage receptacle being removably attachable to the electronic │
│                         device.                 │
│                     -1130-                      │
└─────────────────────────────────────────────────┘
                         ▼
                     ( End )
```

Figure 12

CYLINDRICAL DUAL AXIS HINGE FOR ELECTRONIC DEVICES

TECHNICAL FIELD

This patent application relates to electronic systems, electronic devices, and mobile devices, according to various example embodiments, and more specifically to a cylindrical dual axis hinge for electronic devices.

BACKGROUND

Electronic devices, such as portable devices, all-in-one desktop devices, laptop computers, handheld computers, touch screen systems, and other electronic devices typically include a base with keys and a cover or lid rotationally coupled to the base. These devices are designed for portability and convenience wherein the lid serves both as protection and as a functional portion of the device. The lid often includes a liquid crystal display (LCD) or plasma display which is functionally connected to the electronic device's data processor and memory to display information. The lid may be pivoted from a closed position in which it is folded against the base for storage or transport and to an open position for operation. In the open position, the lid is pivoted to a position so that the user can effectively see and use the screen. In some cases, using the screen can include enabling the user to effect user input by touching the screen or touchscreen on the lid. The position of the screen will depend on factors such as, the height of the user, position of the user in relation to the device, lighting conditions, and the like. Additionally, the lid in many standard electronic devices can be pivoted to a variety of positions in a variety of operational modes. Standard hinge mechanisms on conventional electronic devices are undifferentiated and cannot support electrical power storage.

BRIEF DESCRIPTION OF THE DRAWINGS

The various embodiments are illustrated by way of example, and not by way of limitation, in the figures of the accompanying drawings in which:

FIG. 11 illustrates the cylindrical electrical power storage receptacle of an example embodiment; and FIG. 12 is a processing flow chart illustrating an example embodiment of a method as described herein.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a cylindrical dual axis hinge for electronic devices is disclosed. The example embodiment is denoted a cylindrical dual axis hinge because the example embodiment is generally cylindrical in shape and the example embodiment includes mechanical components supporting two levels of rotation of a component of an electronic device on two axes of rotation. The various embodiments described herein provide several advantages, including: 1) design differentiation relative to existing hinge designs, 2) a capability for additional electrical power storage, and 3) a solution supporting lower cost electrical power storage devices. These and other advantages of the embodiments described herein will become apparent to those of ordinary skill in the art in view of the disclosure provided below.

Figure 1:
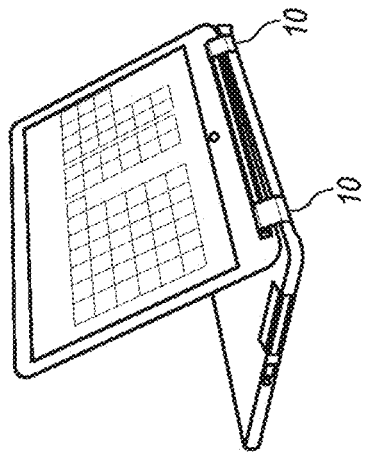
FIG. 1 illustrates several conventional electronic device form factors with a standard dual axis hinge.
Figure 1:
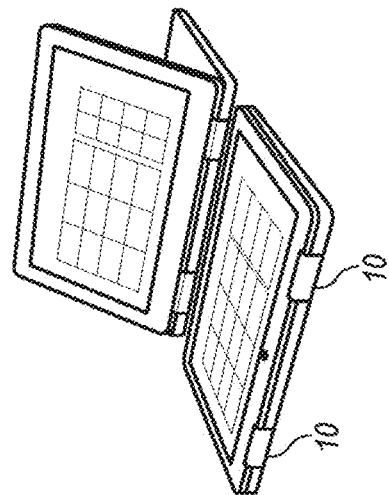
Figure 1:
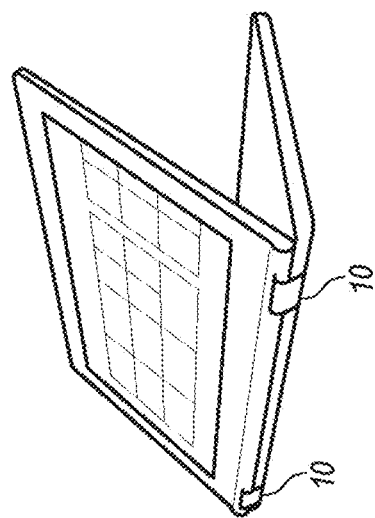
Figure 3:
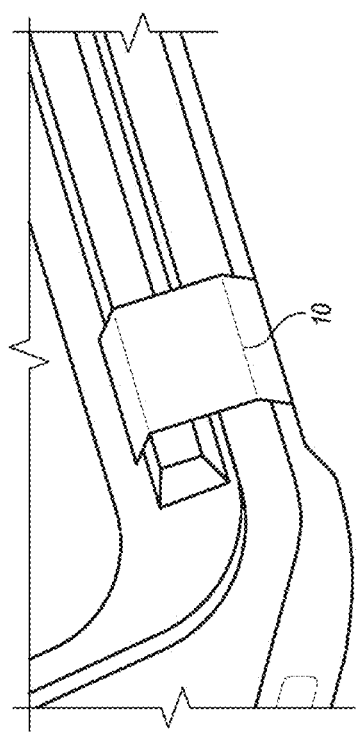
FIG. 3 illustrates a detail of the standard dual axis hinge as shown in FIG. 1.

Referring now to FIG. 1, several conventional electronic device form factors are shown with a standard dual axis hinge 10. The standard dual axis hinge 10 is popular among a variety of electronic device form factors because of the simplicity of the standard hinge 10 in integration and the resulting price point. A detail of the standard dual axis hinge 10 is shown in FIG. 3. This type of design allows a 360 degree rotation of the lid of the electronic device (e.g., touchscreen) about the base of the electronic device allowing many additional use cases other than that of a basic clamshell electronic device configuration. However, one of the issues with the conventional electronic device form factors is that many of these dual axis systems look very similar because of their standard hinge 10 design, thus leading to a lack of system differentiation.

Figure 2:
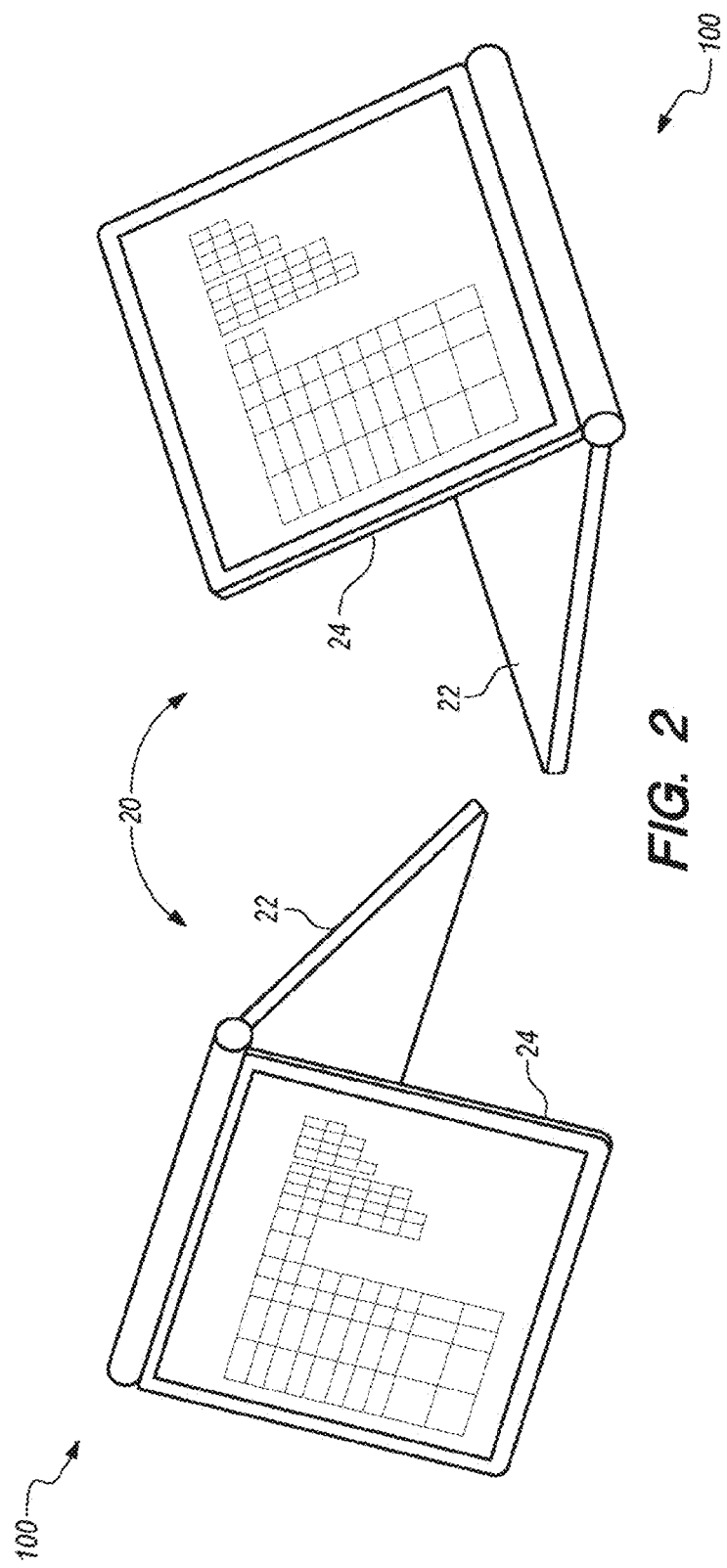
FIG. 2 illustrates a sample electronic device in which an example embodiment of the cylindrical dual axis hinge can be used.
Figure 4:
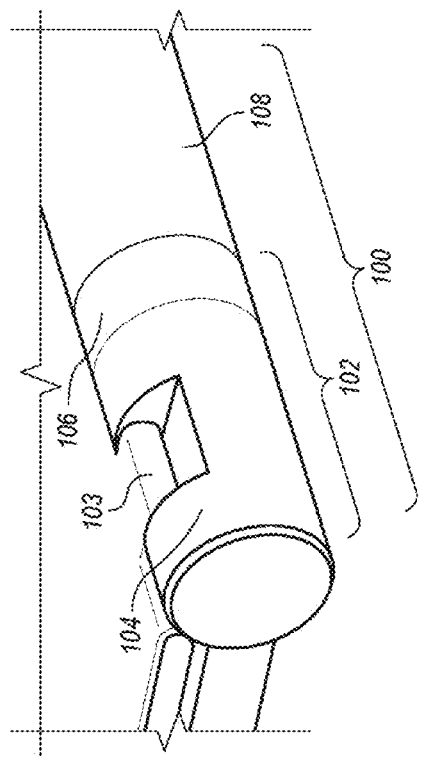
FIG. 4 illustrates a detail of the example embodiment of the cylindrical dual axis hinge as shown in FIG. 2.

FIGS. 2 and 4 illustrate example embodiments of the cylindrical dual axis hinge 100 for electronic devices. FIG. 2 illustrates a sample electronic device 20 in which an example embodiment of the cylindrical dual axis hinge 100 can be used. FIG. 4 illustrates a detail of the example embodiment of the cylindrical dual axis hinge 100 as shown in FIG. 2. As shown in FIG. 4, the cylindrical dual axis hinge 100 of an example embodiment can include a cylindrical hinge subassembly 102 and a cylindrical electrical power storage receptacle 108. The cylindrical hinge subassembly 102 can include a primary hinge 103, a secondary cylindrical hinge rotating portion 104, and a secondary cylindrical hinge fixed portion 106. These components of the cylindrical dual axis hinge 100 of an example embodiment are described in more detail below.

Referring now to FIG. 2, an example embodiment of the cylindrical dual axis hinge 100 described herein is configured to provide hinge control for an electronic device 20 to realize configurable usage experience modes for various electronic devices. As shown in FIG. 2, the cylindrical dual axis hinge 100 can be installed in an electronic device 20 to couple a lid 24 to a base 22 of the electronic device 20 in a rotatable coupling. In many conventional electronic device form factors, the lid 24 can include a display screen or a touchscreen. As described in more detail below, the cylindrical dual axis hinge 100 can be coupled to or captured within a lid fixture, which couples the hinge 100 to the lid 24. In various embodiments, the lid fixture can be or include a flat tab element, a round or circular element, a rectangular element, or a combination thereof. The lid fixture can be attached to the lid 24 or a support member thereof using conventional attaching techniques. The cylindrical dual axis hinge 100 can also be coupled to or captured within a base fixture. The base fixture is a component configured for attachment to the base 22 and thereby coupling the cylindrical dual axis hinge 100 to the base 22. In various embodiments, the base fixture can be or include a flat tab element, a round or circular element, a rectangular element, or a combination thereof. The base fixture can be attached to the base 22 or a support member thereof using conventional attaching techniques. The hinge 100 can include tensioners, such as springs, friction elements, or flanges, in contact with the hinge 100 to apply a level of torque force or drag to the hinge 100 when the hinge 100 is rotated. Various example embodiments are described in more detail below.

Figure 5:
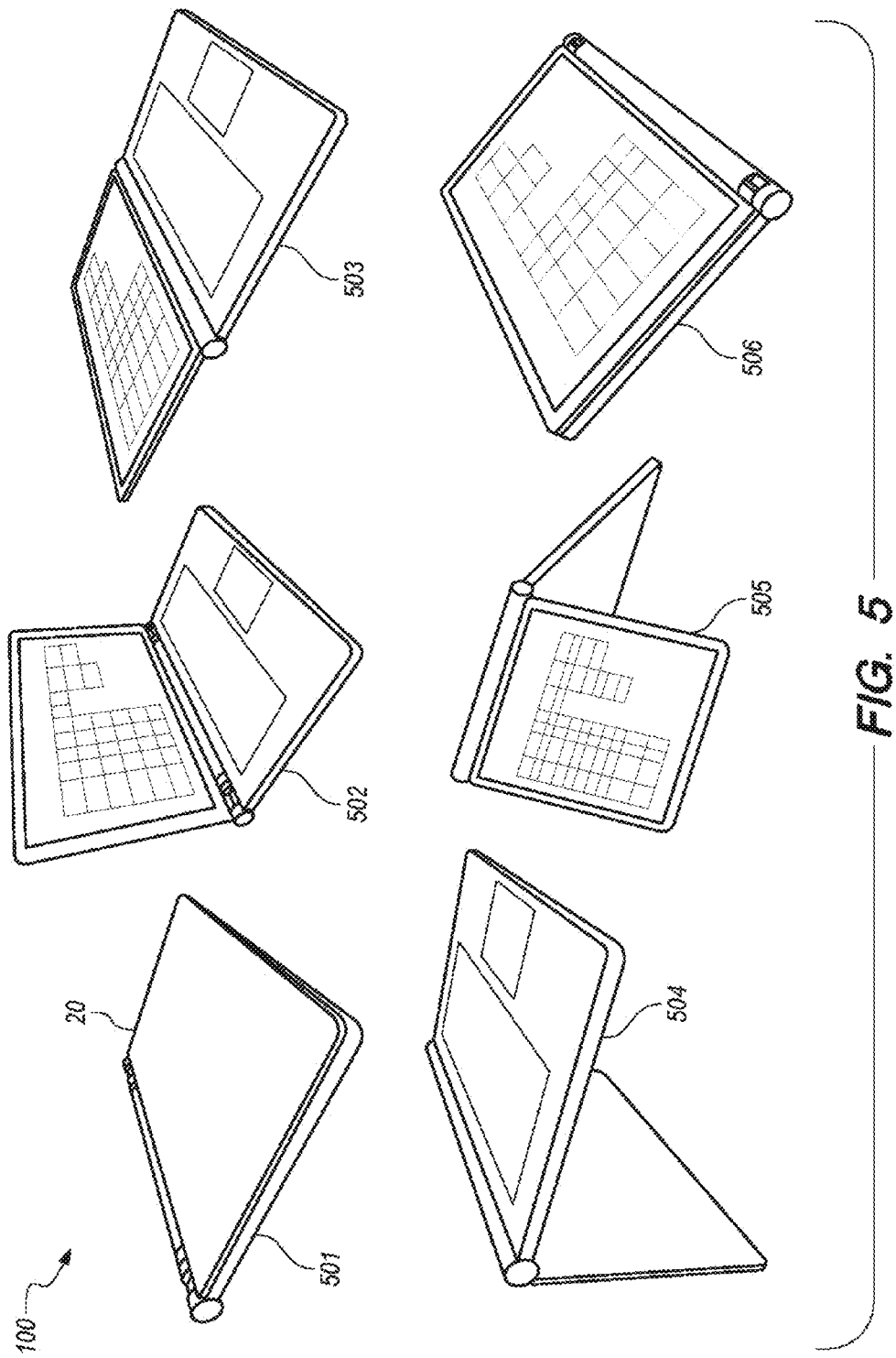
FIG. 5 illustrates a sample electronic device in which an example embodiment of the cylindrical dual axis hinge can be used in a variety of usage models.

FIG. 5 illustrates a sample electronic device 20 in which an example embodiment of the cylindrical dual axis hinge 100 can be used in a variety of usage models. For example, the example 501 shown in FIG. 5 illustrates the sample electronic device 20 in which the hinge 100 coupling the lid and the base of the device 20 has been rotated zero degrees (e.g., the lid is closed). The example 502 shown in FIG. 5 illustrates the sample electronic device 20 in which the hinge 100 coupling the lid and the base of the device 20 has been rotated approximately 100 degrees (e.g., approximately 10 degrees beyond a vertical orientation of the lid). The example 503 shown in FIG. 5 illustrates the electronic device 20 in which the hinge 100 has been rotated approximately 180 degrees (e.g., a horizontal or flat orientation of the lid). The example 504 shown in FIG. 5 illustrates the electronic device 20 in which the hinge 100 has been rotated approximately 270 degrees. The example 505 shown in FIG. 5 illustrates the electronic device 20 in which the hinge 100 has been rotated approximately 290 degrees. The example 506 shown in FIG. 5 illustrates the electronic device 20 in which the hinge 100 has been rotated a full 360 degrees. Thus, the cylindrical dual axis hinge 100 of the various embodiments provides a full zero to 360 degrees of rotation and enables a variety of usage models thereby. The various example embodiments are described in more detail below.

Figure 6:
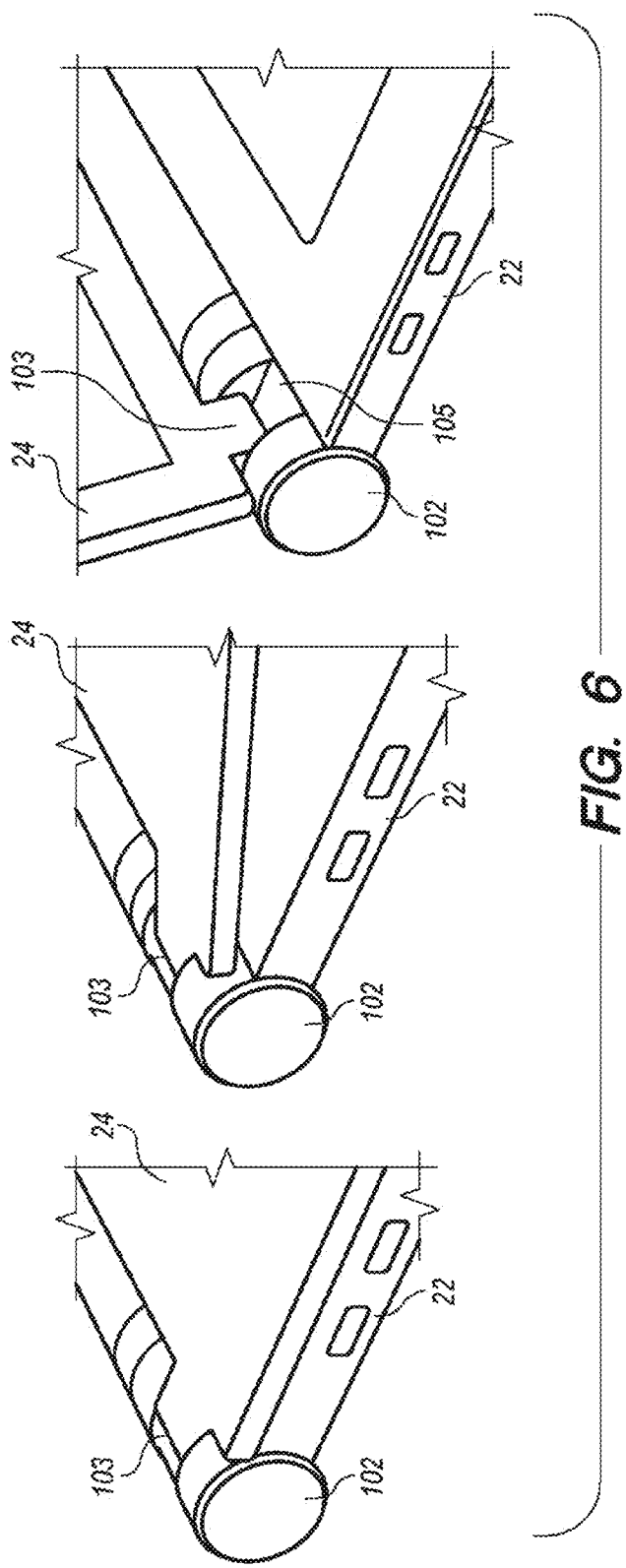
FIG. 6 illustrates the primary hinge of the cylindrical dual axis hinge subassembly of an example embodiment.

In an example embodiment, the cylindrical dual axis hinge 100 includes a cylindrical hinge subassembly 102, which includes a primary hinge 103. FIG. 6 illustrates the primary hinge 103 of the cylindrical dual axis hinge subassembly 102 of an example embodiment. In general, the primary hinge 103 provides the mechanical components used to enable rotation of the primary hinge 103 from the zero degree position (e.g., closed position) to the 180 degree position as shown in FIG. 5. The primary hinge 103 is comprised of a lid fixture captured by a primary pivot mounted in a recessed portion 105 of the hinge subassembly 102 as shown in FIG. 6. The recessed portion 105 enables rotation of the lid fixture of the primary hinge 103 from a zero degree position to a 180 degree position about the primary pivot of the primary hinge 103. The primary pivot of the primary hinge 103 defines a first axis of rotation orthogonal to the direction of motion of the primary hinge 103 and concentric with the primary pivot of the primary hinge 103. By virtue of the recessed portion 105 of the hinge subassembly 102, the lid fixture of the primary hinge 103 is configured to be flush with an upper surface of the hinge 100 when the hinge 100 and the electronic device 20 to which the hinge 100 is attached is in a closed position. In a particular embodiment, the diameter of the cylindrical hinge 100 can be configured to be approximately the same as the sum of the thickness of the base 22 and the thickness of the lid 24. In this manner, the hinge 100 does not significantly increase the profile dimensions of the electronic device 20. In other embodiments as described in more detail below, the diameter of the cylindrical hinge 100 can be configured to accommodate the insertion of a variety of sizes of cylindrical electrical power storage devices (e.g. batteries).

Figure 7:
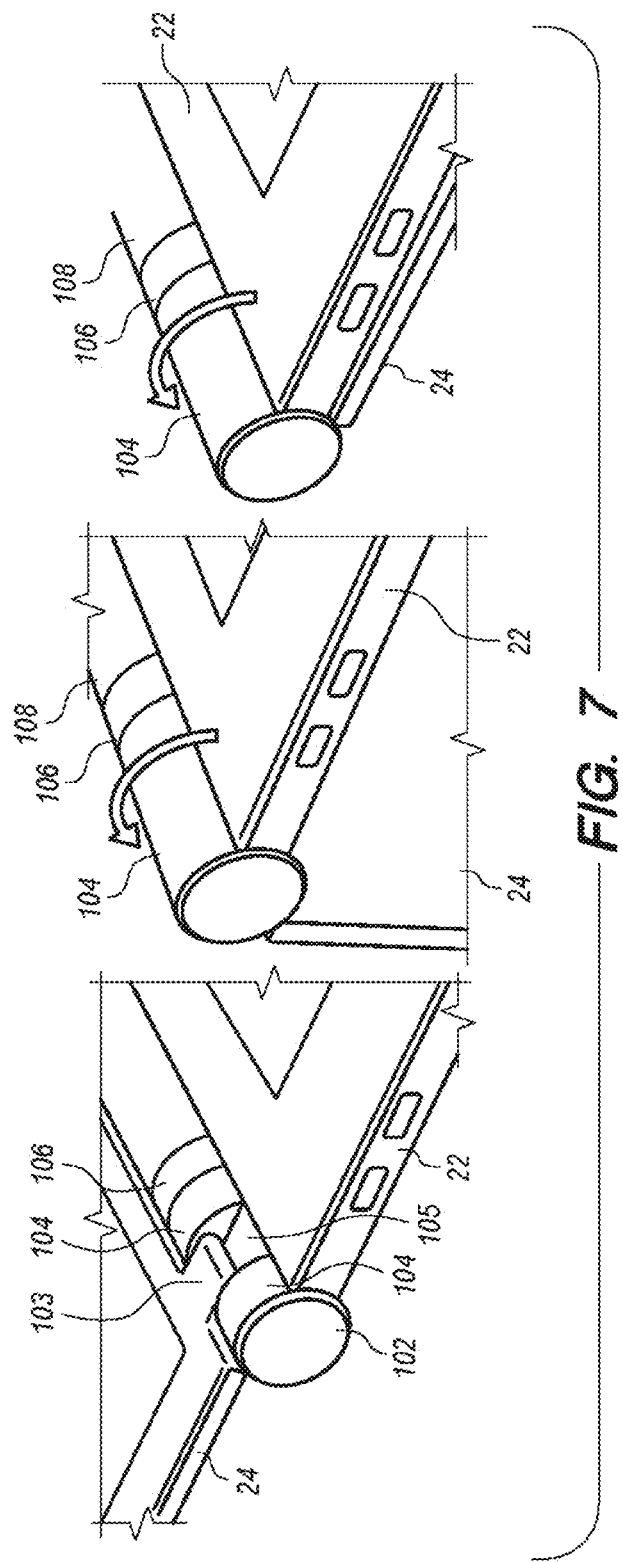
FIG. 7 illustrates the additional features of the cylindrical hinge subassembly of the cylindrical dual axis hinge of an example embodiment.

FIG. 7 illustrates additional features of the cylindrical hinge subassembly 102 of the cylindrical dual axis hinge 100 of an example embodiment. In general, the hinge subassembly 102 also provides the mechanical components used to enable rotation of a secondary cylindrical hinge rotating portion 104 from the 180 degree position to the 360 degree position as shown in FIGS. 5 and 7. The hinge subassembly 102 of an example embodiment also includes the secondary cylindrical hinge rotating portion 104 and a secondary cylindrical hinge fixed portion 106, which can be attached to or integrated into a main chassis or base 22 of an electronic device 20. In the example embodiment, a secondary pivot of the hinge subassembly 102 can be hidden within the cylindrical dual axis hinge 100. The internal components of the hinge subassembly 102 are described in more detail below in connection with FIG. 10. In general, the secondary pivot of the hinge subassembly 102 is captured by the secondary cylindrical hinge fixed portion 106. The secondary cylindrical hinge rotating portion 104 rotates around the secondary pivot of the hinge subassembly 102. The recessed portion 105 operates as a stop for the primary hinge 103 when the primary hinge 103 is rotated to a 180 degree position. At this point, the lid fixture portion of the primary hinge 103 engages a surface of the recessed portion 105 to cause a torque force against the secondary cylindrical hinge rotating portion 104. This force causes the secondary cylindrical hinge rotating portion 104 to begin a rotation about the secondary pivot from the 180 degree position to the 360 degree position as shown in FIG. 7. As a result, the secondary cylindrical hinge rotating portion 104 is configured to begin rotation when the primary hinge 103 reaches a maximal rotation. In the example embodiment, the secondary pivot of the hinge subassembly 102 defines a second axis of rotation orthogonal to the direction of motion of the rotating portion 104 and concentric with the secondary pivot of the hinge subassembly 102.

Figure 8:
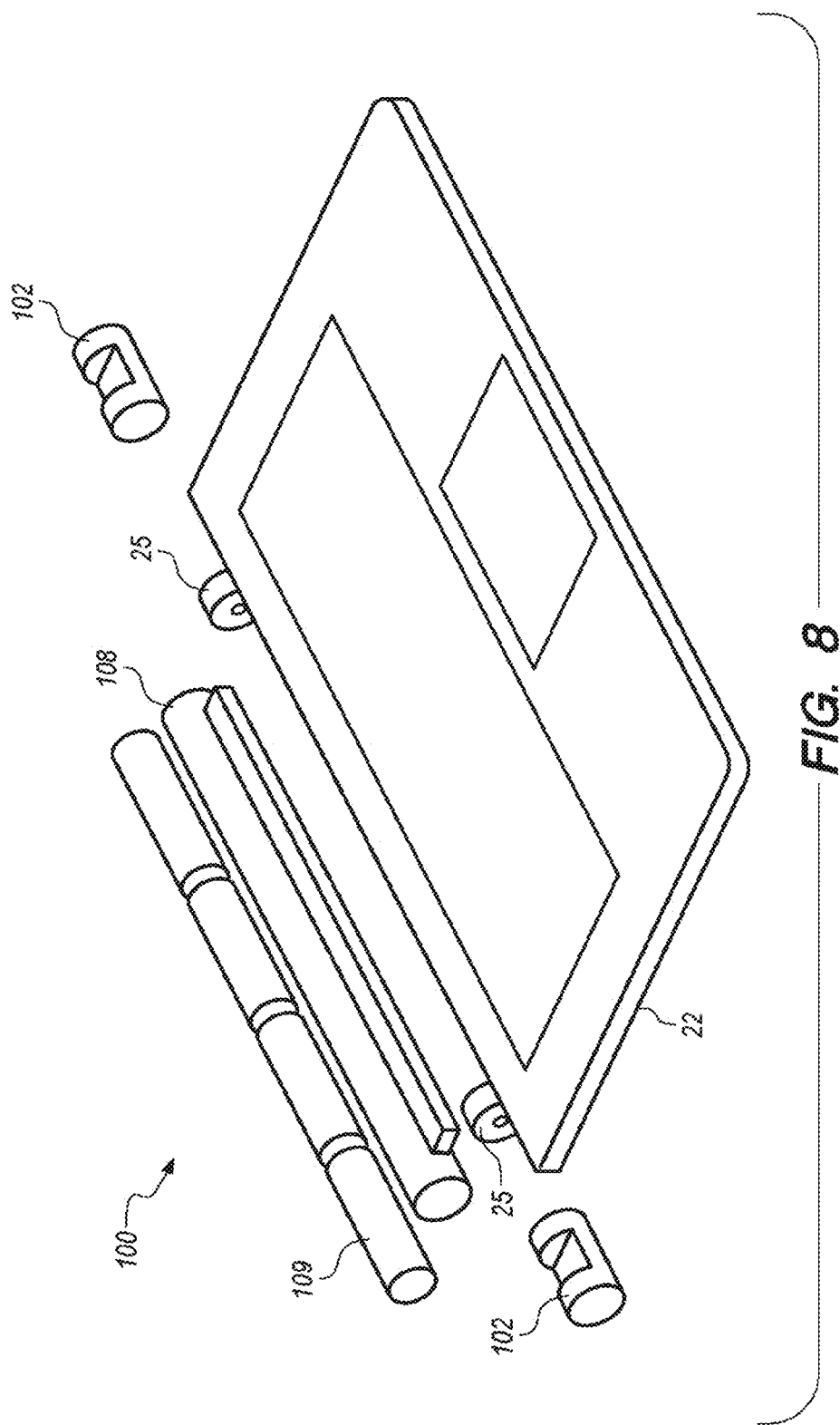
FIG. 8 is an exploded view of the components of the cylindrical dual axis hinge of an example embodiment in combination with a typical base portion of an electronic device to which the cylindrical hinge can be attached.

FIG. 8 is an exploded view of the components of the cylindrical dual axis hinge 100 of an example embodiment in combination with a typical base portion 22 of an electronic device 20 to which the cylindrical hinge 100 can be attached. As shown, right and left portions of the cylindrical hinge subassembly 102 can be attached to corresponding chassis mounts 25 on the base portion 22. The chassis mounts can attached to or integrated with the secondary cylindrical hinge fixed portion 106 of the cylindrical hinge subassembly 102. The cylindrical electrical power storage receptacle 108 can be attached to or integrated with the base portion 22 between the chassis mounts 25 as shown. A plurality of cylindrical electrical power storage elements (e.g., batteries) 109 can be inserted into and retained by the cylindrical electrical power storage receptacle 108. The cylindrical electrical power storage receptacle 108 also includes an electrical interface (e.g., wiring) for transferring electrical power from the power storage elements 109 to a power-receiving subsystem of the base portion 22. This electrical interface is described in more detail below in connection with FIG. 10.

Figure 9:
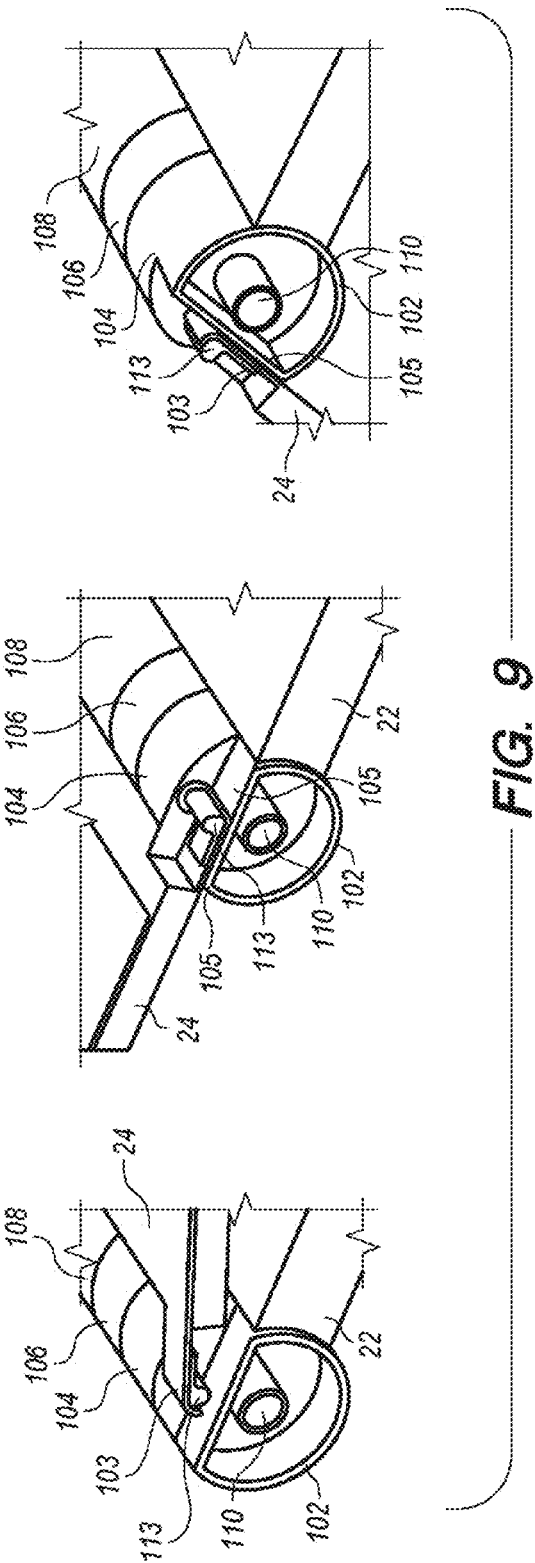
FIG. 9 illustrates a cutaway view of the cylindrical hinge subassembly of the cylindrical dual axis hinge of an example embodiment as attached to an electronic device.

FIG. 9 illustrates a cutaway view of the cylindrical hinge subassembly 102 of the cylindrical dual axis hinge 100 of an example embodiment as attached to an electronic device 20. As shown in FIG. 9, the hinge subassembly 102 includes the primary hinge 103, which can be rotated in either direction around a primary pivot 113, which defines a first axis of rotation orthogonal to the direction of motion of the primary hinge 103 and concentric with the primary pivot 113 of the primary hinge 103. The cylindrical hinge subassembly 102 also includes the secondary hinge rotating portion 104, which can be rotated in either direction around a secondary pivot 110, which defines a second axis of rotation orthogonal to the direction of motion of the secondary hinge rotating portion 104 and concentric with the secondary pivot 110 of the secondary hinge rotating portion 104. As shown in FIG. 9 for the example embodiment, the secondary pivot 110 of the hinge subassembly 102 can be hidden within the cylindrical dual axis hinge 100. The secondary pivot 110 of the hinge subassembly 102 is captured by the secondary cylindrical hinge fixed portion 106 (see FIG. 10). The secondary cylindrical hinge rotating portion 104 rotates around the secondary pivot 110 of the hinge subassembly 102. As shown in FIG. 9, the recessed portion 105 operates as a stop for the primary hinge 103 when the primary hinge 103 is rotated to a 180 degree position. At this point, the lid fixture portion of the primary hinge 103 engages a surface of the recessed portion 105 to cause a torque force against the secondary cylindrical hinge rotating portion 104. This force causes the secondary cylindrical hinge rotating portion 104 to begin a rotation about the secondary pivot 110 from the 180 degree position to the 360 degree position as shown in FIG. 9.

Figure 10:
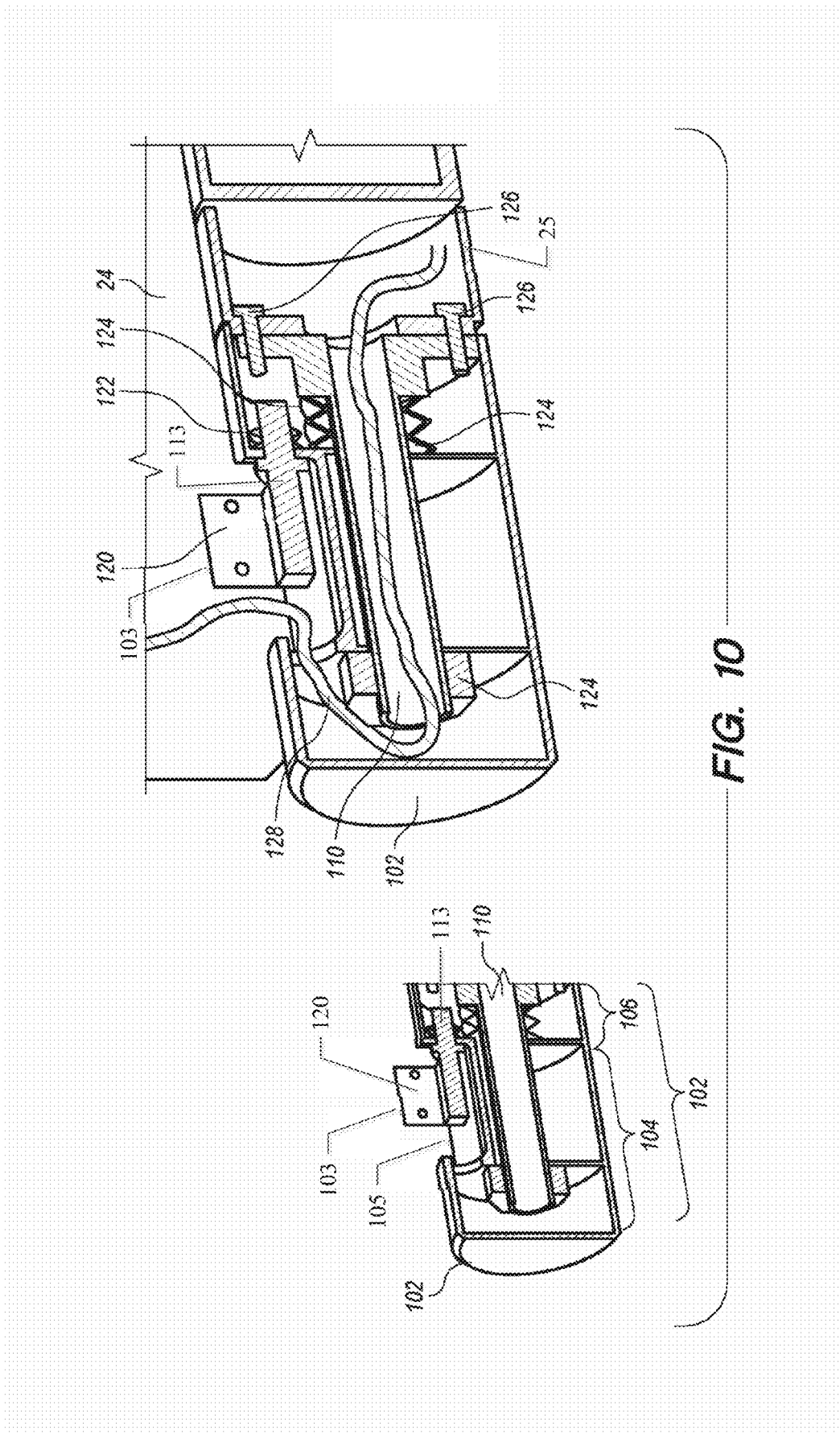
FIG. 10 illustrates a cutaway view of the cylindrical hinge subassembly of the cylindrical dual axis hinge of an example embodiment as unattached to an electronic device.

FIG. 10 illustrates a cutaway view of the cylindrical hinge subassembly 102 of the cylindrical dual axis hinge 100 of an example embodiment as unattached to an electronic device 20. As shown, the cylindrical hinge subassembly 102 can include a secondary cylindrical hinge rotating portion 104, a secondary cylindrical hinge fixed portion 106, and a secondary pivot 110. As described above, the secondary pivot 110 can be captured and retained by the secondary cylindrical hinge fixed portion 106. The secondary cylindrical hinge fixed portion 106 can be attached to or integrated with the base portion 22 of the electronic device 20 at the chassis mounts 25 via attachment pins 126. The secondary cylindrical hinge rotating portion 104 can be rotated around the secondary pivot 110. The cylindrical hinge subassembly 102 can further include the primary hinge 103, which can be attached to the lid 24 of the electronic device 20 via a primary hinge bracket 120. The primary hinge bracket 120 of the primary hinge 103 can serve as a lid fixture or attachment bracket. The primary hinge 103 can further include the primary pivot 113 around which the primary hinge 103 can be rotated. The primary pivot 113 can be captured and retained by the secondary cylindrical hinge fixed portion 106 as shown in FIG. 10. The cylindrical hinge subassembly 102 can further include an electrical interface (e.g., wiring) 128 to transfer electrical power from the power storage elements 109 retained by the electrical power storage receptacle 108 to the base portion 22 of the electronic device 20 via the chassis mounts 25 as shown in FIG. 10. In a particular embodiment, the electrical interface 128 can be threaded through an end of the secondary pivot 110. In other embodiments, electrically conductive elements can be provided with or within the chassis mounts 25 to provide a conductive path for the transfer of electrical power from the power storage elements 109 to the base 22. The cylindrical hinge subassembly 102 can further include primary hinge torque elements 122 and secondary hinge torque elements 124 to apply a torque force or drag to the primary hinge 103 and the secondary hinge rotating portion 104, respectively. In particular as shown in FIG. 10, the primary hinge torque elements 122 apply a force or drag to the primary pivot 113 of primary hinge 103. The secondary hinge torque elements 124 apply a force or drag to the secondary pivot 110 of the cylindrical hinge subassembly 102. The primary hinge torque elements 122 and secondary hinge torque elements 124 enable a user to position the lid 24 of an electronic device 20 at a particular position and to retain the lid 24 at the desired position.

FIG. 11 illustrates the cylindrical electrical power storage receptacle 108 of an example embodiment. As described above, the cylindrical electrical power storage receptacle 108 can be attached to or integrated with the base portion 22 of electronic device 20 between the chassis mounts 25 as shown. A plurality of cylindrical electrical power storage elements (e.g., batteries) 109 can be inserted into and retained by the cylindrical electrical power storage receptacle 108. The power storage receptacle 108 is configured for separate removal from the electronic device 20 and the cylindrical hinge subassembly 102 so the electrical power elements 109 contained therein can be serviced. When attached to the electronic device 20, the cylindrical power storage receptacle 108 achieves a position flush with the cylindrical hinge subassembly 102 so the design appears clean and compatible with the appearance of the electronic device 20 as shown in FIG. 11. In the various embodiments described herein, the cylindrical hinge subassembly 102 is configured to be coaxial with the cylindrical power storage receptacle 108. This configuration allows the cylindrical hinge 100 to rotate without producing a negative design impact to the electronic device 20 as a whole. In other words, in the various embodiments described herein, the cylindrical hinge 100 can produce the benefits of a full rotation while being more or less invisible to the user, unlike the current dual hinge systems. In alternative embodiments, the diameter of the cylindrical power storage receptacle 108 can be varied to accommodate various sizes of electrical power elements 109 (e.g., 18650 or 16650 type batteries, or the like). It will be apparent to those of ordinary skill in the art in view of the disclosure herein that other alternative embodiments of hinge 100 can be implemented in a shape other than cylindrical.

Referring now to FIG. 12, a processing flow diagram illustrates an example embodiment of a method 1100 for a cylindrical dual axis hinge for electronic devices as described herein. The method 1100 of an example embodiment includes: providing a primary hinge having a primary pivot with a first axis of rotation, the primary hinge including a primary hinge bracket attachable to a portion of the electronic device (processing block 1110); providing a cylindrical hinge subassembly including a secondary cylindrical hinge rotating portion and a secondary cylindrical hinge fixed portion, the cylindrical hinge subassembly including a secondary pivot with a second axis of rotation different from the first axis of rotation and enabling rotation of the secondary cylindrical hinge rotating portion around the secondary pivot, the cylindrical hinge subassembly being attachable to a portion of the electronic device (processing block 1120); and providing a cylindrical electrical power storage receptacle configured to retain a plurality of electrical power storage elements, the electrical power storage elements being in electrical contact with the electronic device, the cylindrical electrical power storage receptacle being removably attachable to the electronic device (processing block 1130).

The various embodiments as described herein can provide several advantages over conventional hinge mechanisms. Firstly, the various embodiments described herein provide design differentiation relative to existing hinge designs. Secondly, the various embodiments described herein provide a capability for additional electrical power storage. Thirdly, the various embodiments described herein provide a solution supporting lower cost electrical power storage devices. These and other advantages of the embodiments described herein will become apparent to those of ordinary skill in the art in view of the disclosure provided herein.

In various embodiments as described herein, example embodiments include at least the following examples.

A cylindrical dual axis hinge for an electronic device, the cylindrical dual axis hinge comprising: a primary hinge having a primary pivot with a first axis of rotation, the primary hinge including a primary hinge bracket attachable to a portion of the electronic device; a cylindrical hinge subassembly including a secondary cylindrical hinge rotating portion and a secondary cylindrical hinge fixed portion, the cylindrical hinge subassembly including a secondary pivot with a second axis of rotation different from the first axis of rotation and enabling rotation of the secondary cylindrical hinge rotating portion around the secondary pivot, the cylindrical hinge subassembly being attachable to a portion of the electronic device; and a cylindrical electrical power storage receptacle configured to retain a plurality of electrical power storage elements, the electrical power storage elements being in electrical contact with the electronic device, the cylindrical electrical power storage receptacle being removably attachable to the electronic device.

The cylindrical dual axis hinge as claimed above wherein the primary hinge being installed in a recess of the cylindrical hinge subassembly.

The cylindrical dual axis hinge as claimed above wherein the primary hinge being configured to rotate from zero to 180 degrees.

The cylindrical dual axis hinge as claimed above wherein the secondary cylindrical hinge rotating portion being configured to rotate from 180 degrees to 360 degrees.

The cylindrical dual axis hinge as claimed above wherein the secondary cylindrical hinge rotating portion being configured to begin rotation when the primary hinge reaches a maximal rotation.

The cylindrical dual axis hinge as claimed above wherein the plurality of electrical power storage elements are cylindrical batteries.

The cylindrical dual axis hinge as claimed above wherein the cylindrical hinge subassembly further including hinge torque elements to apply a force to the secondary cylindrical hinge rotating portion.

The cylindrical dual axis hinge as claimed above wherein the cylindrical electrical power storage receptacle including an electrical interface to transfer electrical power to the electronic device.

The cylindrical dual axis hinge as claimed above wherein the cylindrical hinge subassembly is configured to be coaxial with the cylindrical electrical power storage receptacle.

An electronic system comprising: a lid; a base; a cylindrical dual axis hinge configured to couple the lid with the base, the cylindrical dual axis hinge including a primary hinge having a primary pivot with a first axis of rotation, the primary hinge including a primary hinge bracket attachable to the lid; a cylindrical hinge subassembly including a secondary cylindrical hinge rotating portion and a secondary cylindrical hinge fixed portion, the cylindrical hinge subassembly including a secondary pivot with a second axis of rotation different from the first axis of rotation and enabling rotation of the secondary cylindrical hinge rotating portion around the secondary pivot, the cylindrical hinge subassembly being attachable to the base; and a cylindrical electrical power storage receptacle configured to retain a plurality of electrical power storage elements, the electrical power storage elements being in electrical contact with the electronic device, the cylindrical electrical power storage receptacle being removably attachable to the base.

The electronic system as claimed above wherein the primary hinge being installed in a recess of the cylindrical hinge subassembly.

The electronic system as claimed above wherein the primary hinge being configured to rotate from zero to 180 degrees.

The electronic system as claimed above wherein the secondary cylindrical hinge rotating portion being configured to rotate from 180 degrees to 360 degrees.

The electronic system as claimed above wherein the secondary cylindrical hinge rotating portion being configured to begin rotation when the primary hinge reaches a maximal rotation.

The electronic system as claimed above wherein the plurality of electrical power storage elements are cylindrical batteries.

The electronic system as claimed above wherein the cylindrical hinge subassembly further including hinge torque elements to apply a force to the secondary cylindrical hinge rotating portion.

The electronic system as claimed above wherein the cylindrical electrical power storage receptacle including an electrical interface to transfer electrical power to the base.

The electronic system as claimed above wherein the cylindrical hinge subassembly is configured to be coaxial with the cylindrical electrical power storage receptacle.

An apparatus comprising: a primary hinging means having a primary pivot means with a first axis of rotation, the primary hinging means including a primary hinge bracketing means attachable to a portion of an electronic device; a cylindrical hinging subassembly means including a secondary cylindrical hinge rotating means and a secondary cylindrical hinge fixed means, the cylindrical hinging subassembly means including a secondary pivot means with a second axis of rotation different from the first axis of rotation and enabling rotation of the secondary cylindrical hinge rotating means around the secondary pivot means, the cylindrical hinging subassembly means being attachable to a portion of the electronic device; and a cylindrical electrical power storage means configured to retain a plurality of electrical power storage elements, the electrical power storage elements being in electrical contact with the electronic device, the cylindrical electrical power storage means being removably attachable to the electronic device.

The apparatus as claimed above wherein the primary hinging means being installed in a recess of the cylindrical hinging subassembly means.

The apparatus as claimed above wherein the primary hinging means being configured to rotate from zero to 180 degrees.

The apparatus as claimed above wherein the secondary cylindrical hinge rotating means being configured to rotate from 180 degrees to 360 degrees.

The apparatus as claimed above wherein the secondary cylindrical hinge rotating means being configured to begin rotation when the primary hinging means reaches a maximal rotation.

The apparatus as claimed above wherein the plurality of electrical power storage elements are cylindrical batteries.

The apparatus as claimed above wherein the cylindrical hinging subassembly means further including hinge torque elements to apply a force to the secondary cylindrical hinge rotating means.

The apparatus as claimed above wherein the cylindrical electrical power storage means including an electrical interface to transfer electrical power to the apparatus.

The apparatus as claimed above wherein the cylindrical hinging subassembly means is configured to be coaxial with the cylindrical electrical power storage means.

A method comprising: providing a primary hinge having a primary pivot with a first axis of rotation, the primary hinge including a primary hinge bracket attachable to a portion of the electronic device; providing a cylindrical hinge subassembly including a secondary cylindrical hinge rotating portion and a secondary cylindrical hinge fixed portion, the cylindrical hinge subassembly including a secondary pivot with a second axis of rotation different from the first axis of rotation and enabling rotation of the secondary cylindrical hinge rotating portion around the secondary pivot, the cylindrical hinge subassembly being attachable to a portion of the electronic device; and providing a cylindrical electrical power storage receptacle configured to retain a plurality of electrical power storage elements, the electrical power storage elements being in electrical contact with the electronic device, the cylindrical electrical power storage receptacle being removably attachable to the electronic device.

The method as claimed above wherein the primary hinge being installed in a recess of the cylindrical hinge subassembly.

The method as claimed above wherein the primary hinge being configured to rotate from zero to 180 degrees.

The method as claimed above wherein the secondary cylindrical hinge rotating portion being configured to rotate from 180 degrees to 360 degrees.

The method as claimed above wherein the secondary cylindrical hinge rotating portion being configured to begin rotation when the primary hinge reaches a maximal rotation.

The method as claimed above wherein the plurality of electrical power storage elements are cylindrical batteries.

The method as claimed above including providing hinge torque elements to apply a force to the secondary cylindrical hinge rotating portion.

The method as claimed above including providing an electrical interface to transfer electrical power to the electronic device.

The method as claimed above wherein the cylindrical hinge subassembly is configured to be coaxial with the cylindrical electrical power storage receptacle.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A cylindrical dual axis hinge for an electronic device, the cylindrical dual axis hinge comprising:
    a primary hinge having a primary pivot with a first axis of rotation, the primary hinge including a primary hinge bracket attachable to a portion of the electronic device;
    a cylindrical hinge subassembly including a secondary cylindrical hinge rotating portion and a secondary cylindrical hinge fixed portion, the cylindrical hinge subassembly including a secondary pivot with a second axis of rotation different from the first axis of rotation and enabling rotation of the secondary cylindrical hinge rotating portion around the secondary pivot, the cylindrical hinge subassembly being attachable to a portion of the electronic device; and
    a cylindrical electrical power storage receptacle configured to retain a plurality of electrical power storage elements, the electrical power storage elements being in electrical contact with the electronic device, the cylindrical electrical power storage receptacle being removably attachable to the electronic device.

2. The cylindrical dual axis hinge of claim 1 wherein the primary hinge being installed in a recess of the cylindrical hinge subassembly.

3. The cylindrical dual axis hinge of claim 1 wherein the primary hinge being configured to rotate from zero to 180 degrees.

4. The cylindrical dual axis hinge of claim 1 wherein the secondary cylindrical hinge rotating portion being configured to rotate from 180 degrees to 360 degrees.

5. The cylindrical dual axis hinge of claim 1 wherein the secondary cylindrical hinge rotating portion being configured to begin rotation when the primary hinge reaches a maximal rotation.

6. The cylindrical dual axis hinge of claim 1 wherein the plurality of electrical power storage elements are cylindrical batteries.

7. The cylindrical dual axis hinge of claim 1 wherein the cylindrical hinge subassembly further including hinge torque elements to apply a force to the secondary cylindrical hinge rotating portion.

8. The cylindrical dual axis hinge of claim 1 wherein the cylindrical electrical power storage receptacle including an electrical interface to transfer electrical power to the electronic device.

9. The cylindrical dual axis hinge of claim 1 wherein the cylindrical hinge subassembly is configured to be coaxial with the cylindrical electrical power storage receptacle.

10. An electronic system comprising:
    a lid;
    a base;
    a cylindrical dual axis hinge configured to couple the lid with the base, the cylindrical dual axis hinge including a primary hinge having a primary pivot with a first axis of rotation, the primary hinge including a primary hinge bracket attachable to the lid; a cylindrical hinge subassembly including a secondary cylindrical hinge rotating portion and a secondary cylindrical hinge fixed portion, the cylindrical hinge subassembly including a secondary pivot with a second axis of rotation different from the first axis of rotation and enabling rotation of the secondary cylindrical hinge rotating portion around the secondary pivot, the cylindrical hinge subassembly being attachable to the base; and a cylindrical electrical power storage receptacle configured to retain a plurality of electrical power storage elements, the electrical power storage elements being in electrical contact with the electronic device, the cylindrical electrical power storage receptacle being removably attachable to the base.

11. The electronic system of claim 10 wherein the primary hinge being installed in a recess of the cylindrical hinge subassembly.

12. The electronic system of claim 10 wherein the primary hinge being configured to rotate from zero to 180 degrees.

13. The electronic system of claim 10 wherein the secondary cylindrical hinge rotating portion being configured to rotate from 180 degrees to 360 degrees.

14. The electronic system of claim 10 wherein the secondary cylindrical hinge rotating portion being configured to begin rotation when the primary hinge reaches a maximal rotation.

15. The electronic system of claim 10 wherein the plurality of electrical power storage elements are cylindrical batteries.

16. The electronic system of claim 10 wherein the cylindrical hinge subassembly further including hinge torque elements to apply a force to the secondary cylindrical hinge rotating portion.

17. The electronic system of claim 10 wherein the cylindrical electrical power storage receptacle including an electrical interface to transfer electrical power to the base.

18. The electronic system of claim 10 wherein the cylindrical hinge subassembly is configured to be coaxial with the cylindrical electrical power storage receptacle.

19. An apparatus comprising:
a primary hinging means having a primary pivot means with a first axis of rotation, the primary hinging means including a primary hinge bracketing means attachable to a portion of an electronic device;
a cylindrical hinging subassembly means including a secondary cylindrical hinge rotating means and a secondary cylindrical hinge fixed means, the cylindrical hinging subassembly means including a secondary pivot means with a second axis of rotation different from the first axis of rotation and enabling rotation of the secondary cylindrical hinge rotating means around the secondary pivot means, the cylindrical hinging subassembly means being attachable to a portion of the electronic device; and
a cylindrical electrical power storage means configured to retain a plurality of electrical power storage elements, the electrical power storage elements being in electrical contact with the electronic device, the cylindrical electrical power storage means being removably attachable to the electronic device.

20. The apparatus of claim 19 wherein the primary hinging means being installed in a recess of the cylindrical hinging subassembly means.

21. The apparatus of claim 19 wherein the primary hinging means being configured to rotate from zero to 180 degrees.

22. The apparatus of claim 19 wherein the secondary cylindrical hinge rotating means being configured to rotate from 180 degrees to 360 degrees.

23. The apparatus of claim 19 wherein the cylindrical hinging subassembly means is configured to be coaxial with the cylindrical electrical power storage means.

* * * * *